(12) United States Patent
Nagashii

(10) Patent No.: US 7,014,240 B2
(45) Date of Patent: Mar. 21, 2006

(54) U-SHAPED LOCKING ANTI-THEFT TOOL STORAGE AND SUPPORT STRUCTURE IN VEHICLE

(75) Inventor: Toshihisa Nagashii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 10/855,884

(22) Filed: May 27, 2004

(65) Prior Publication Data

US 2005/0017531 A1    Jan. 27, 2005

(30) Foreign Application Priority Data

Jun. 9, 2003    (JP) .............................. 2003-164190

(51) Int. Cl.
*B60R 7/00* (2006.01)
(52) U.S. Cl. .................. 296/37.1; 296/37.15; 296/1.05
(58) Field of Classification Search ............... 296/37.1, 296/37.15, 1.05
See application file for complete search history.

(56) References Cited

U.S. PATENT DOCUMENTS

| 6,357,542 | B1 * | 3/2002 | Sako ......................... 296/37.1 |
| 2004/0195855 | A1 * | 10/2004 | Takeshima ................. 296/37.1 |

FOREIGN PATENT DOCUMENTS

JP            07329847        12/1995

* cited by examiner

*Primary Examiner*—Lori L. Coletta
(74) *Attorney, Agent, or Firm*—Carrier, Blackman & Associates, P.C.; William D. Blackman; Joseph P. Carrier

(57) ABSTRACT

A housing support structure includes a tool housing for receiving and supporting a U-shaped locking anti-theft tool, in a vehicle having a main frame section and a pair of seat rails. The housing support structure includes a rear cover apparatus having right and left side covers for covering both seat rails from the outside, and a bottom panel section forming the bottom of the housing. The bottom panel section extends between both side covers and is provided for covering both seat rails from the top. The housing is configured to fit on top of the seat rails, with a major part of the seat rails disposed outside of the housing.

11 Claims, 7 Drawing Sheets

U-SHAPED LOCKING ANTI-THEFT TOOL STORAGE AND SUPPORT STRUCTURE IN VEHICLE

CROSS-REFERENCE TO RELATED APPLICATIONS

The present invention claims priority under 35 USC 119 based on Japanese patent application No. 2003-164190, filed Jun. 9, 2003.

BACKGROUND OF THE INVENTION

1. Field of the Invention

The present invention relates to a housing support structure for receiving and storing a U-shaped locking anti-theft tool on a vehicle having right and left seat rails, and a seat supported on the rails, in which the housing is formed inside a rear cover apparatus which covers the outside of both seat rails. More particularly, the present invention relates to the improvement of structure for housing and supporting a U-shaped locking anti-theft tool on a saddle-type vehicle, such as a motorcycle.

2. Description of the Background Art

A type of tool housing is known for a motorcycle, in which the housing is formed inside a rear cover apparatus which is disposed above the rear wheel of the motorcycle. This known housing covers the outside of a pair of right and left seat rails, and is supported thereon. In this known design, a pivotally-mounted seat is provided above the housing and the rails, and a U-shaped locking anti-theft tool is housed in the housing (refer to Japanese published patent document JP-A-7-329847, for example).

In the above-mentioned conventional structure, although supporting rigidity is enhanced, and the U-shaped locking anti-theft tool can be supported in the housing, a degree of freedom in design below and between both seat rails is limited, because a part of both seat rails is housed in the housing.

Although the known U-shaped locking anti-theft tools have some utility for their intended purposes, there is still a need to provide an improved housing for receiving and supporting a U-shaped locking anti-theft tool. More particularly, there is a need for an improved housing for a U-shaped locking anti-theft tool, in which the housing is configured to be mounted on a motorcycle with the seat rails of the motorcycle frame disposed substantially outside of the housing.

SUMMARY OF THE INVENTION

The present invention is made in view of the problems with the known motorcycle anti-theft tool housings, and it is an object of the present invention to provide a housing support structure for a U-shaped locking anti-theft tool in a vehicle, in which a degree of freedom in design below and between both seat rails is enhanced.

To achieve the above object, the invention according to a first aspect hereof is based upon a vehicle in which a pair of right and left inclined seat rails extend so that the rear section thereof is elevated, and these seat rails are connected to the rear of a main frame section extended angling downwardly from a head pipe. In the first aspect of the invention, a housing is formed inside a rear cover apparatus for supportively receiving a U-shaped locking anti-theft tool, in which the rear cover apparatus covers at least the outside of both seat rails.

Seats, including lids that can be lifted, are provided above the cover, and the rear cover apparatus is also provided with a pair of right and left side portions covering both seat rails from the outside. The housing also includes a bottom panel section, extending between both side covers and covering the tops of both seat rails. A respective projection boss extends from each of the side rails through a respective hole formed in the bottom panel section, and the upper ends of these projection bosses extend into the housing. A main bar portion of the U-shaped locking anti-theft tool is fitted to a cross plate in the housing, which extends between the upper ends of the projection bosses.

According to the above-mentioned configuration of the invention according to the first aspect, as the U-shaped locking anti-theft tool is supportively received in the housing inside the rear cover apparatus, with the bottom panel section covering the tops of a pair of seat rails, so that the bottom panel section functions as the bottom of the housing, a degree of freedom in design below and between both seat rails can be enhanced. In addition, as the main bar of the U-shaped locking anti-theft tool is fitted to the cross plate interconnecting the projection bosses of both seat rails in the housing, the supporting rigidity of the U-shaped locking anti-theft tool can also be enhanced.

A second aspect of the invention is based upon the configuration of the invention according to the first aspect, and is further characterized in that an exhaust muffler, suspended from the main frame section, is arranged between both seat rails below the bottom panel section of the housing, and is operatively supported by both seat rails. According to such configuration, the exhaust muffler is effectively arranged using space between both seat rails.

Further, the invention according to a third aspect hereof is based upon the configuration of the invention according to the first aspect, and is further characterized in that a platform is raised upwardly in a central area between both seat rails, and a pair of recessed flanking parts are integrally connected to the sides of the platform, and fastened to both projection bosses.

Both ends of the main bar of the U-shaped locking anti-theft tool rest on the respective recessed flanking parts. According to such configuration, the rigidity of the cross plate can be enhanced by forming the cross plate in a curved shape, and both ends of the main bar can be stably supported by the cross plate, effectively using the curved shape thereof.

For a more complete understanding of the present invention, the reader is referred to the following detailed description section, which should be read in conjunction with the accompanying drawings. Note that front, rear, left and right in the description below are front, rear, left and right taken from the vantage point of a driver seated on the vehicle and facing in the forward traveling direction of the vehicle.

DETAILED DESCRIPTION

Referring to the attached drawings, FIGS. 1 to 7 show different aspects of a motorcycle incorporating a selected illustrative embodiment of the present invention.

Figure 1:
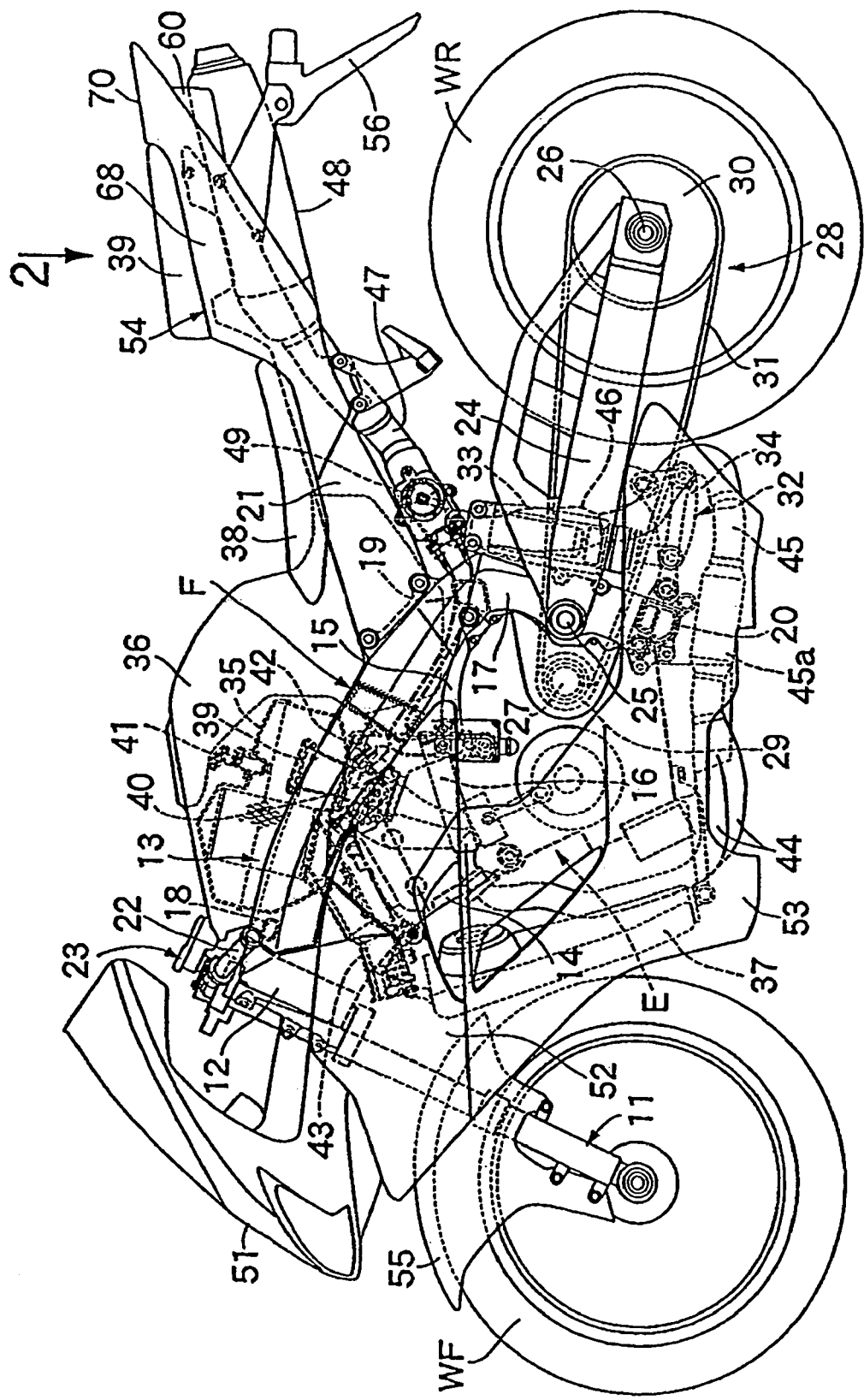
FIG. 1 is a side elevational view showing a motorcycle incorporating a selected embodiment of the present invention.
Figure 2:
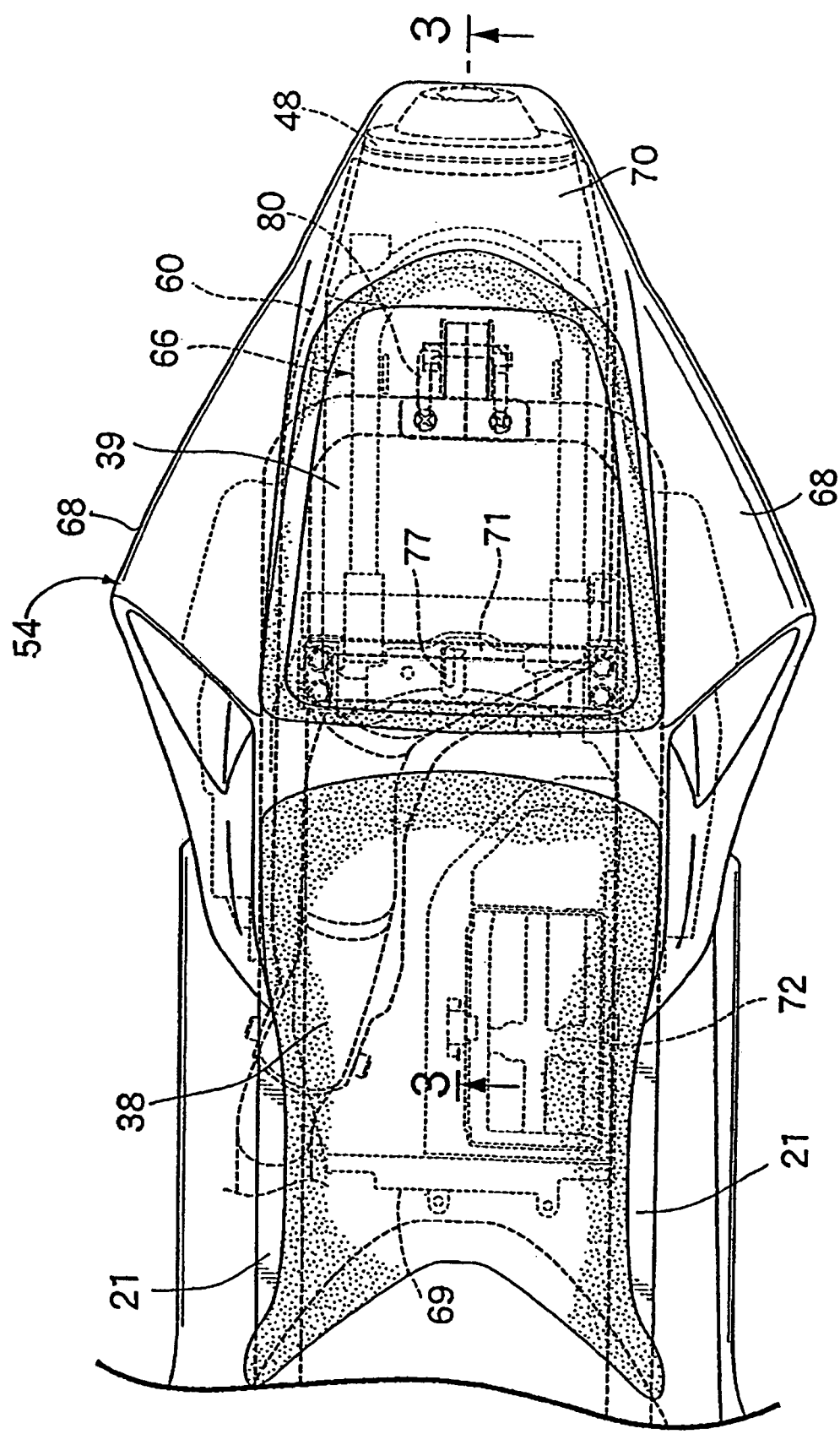
FIG. 2 is an enlarged top plan view, partially cut away, of a rear portion of the motorcycle of FIG. 1, viewed from a direction shown by an arrow 2 in FIG. 1.
Figure 3:
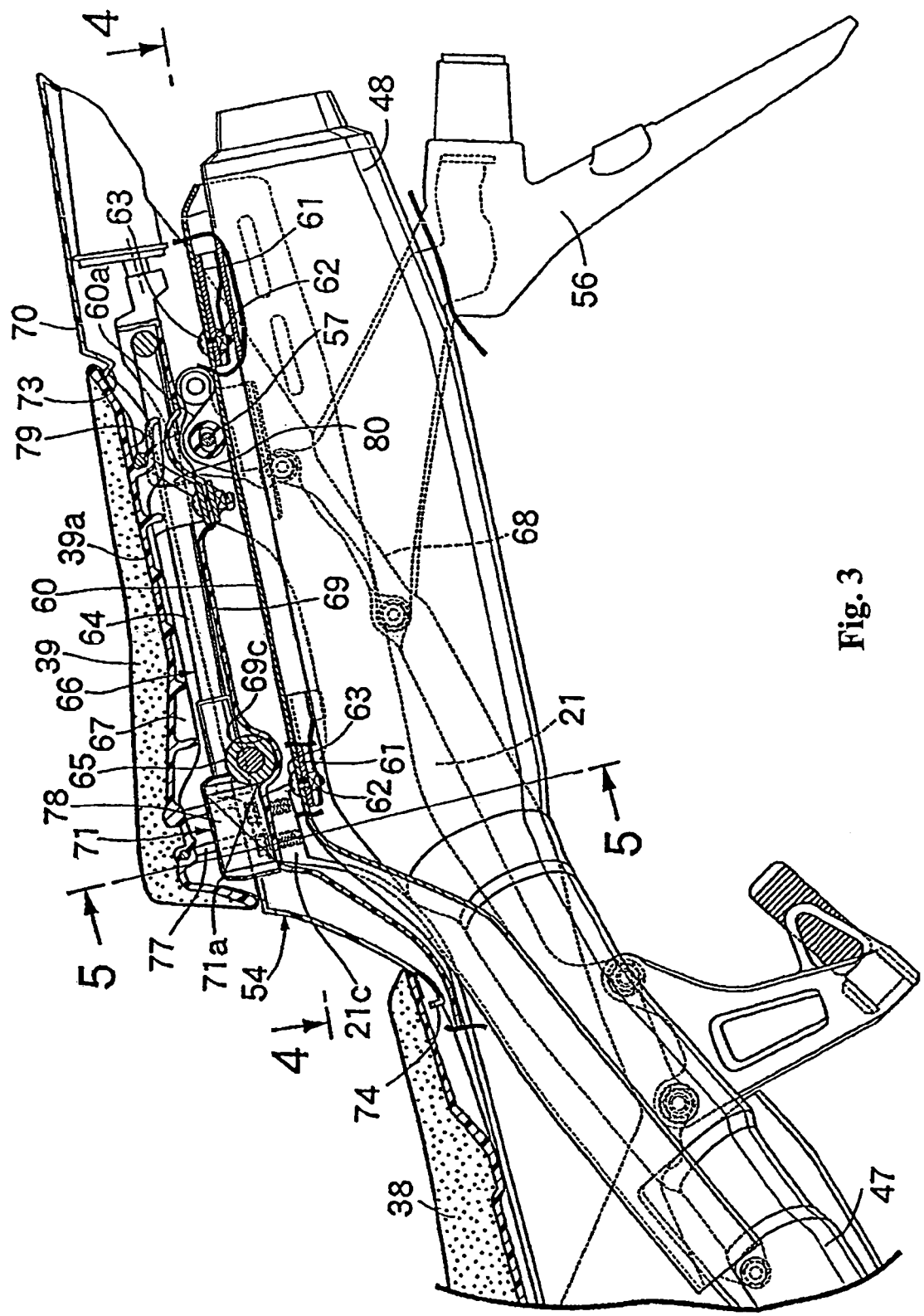
FIG. 3 is a sectional view of the rear portion of the motorcycle of FIGS. 1–2, viewed along a line 3—3 shown in FIG. 2.

As shown in FIG. 1, motorcycle includes a body frame F including a head pipe 12 that supports a front fork 11, which in turn supports a front wheel WF thereon. The head pipe 12 pivotally supports the front fork 11, so that the front fork can be steered.

The frame F also includes a pair of right and left main frame sections 13, integrally attached to the head pipe 12 and extending rearwardly and downwardly therefrom. The frame F further includes a pair of right and left engine hangers 14, respectively welded to the head pipe 12 and to the front of both main frame sections 13, and extending downwardly from the main frame sections 13. The frame F also includes coupling pipes 16, for coupling each lower part of both engine hangers 14, and supporting plates 15, respectively provided on the rear of each of the main frame sections 13, as well as a pair of right and left pivot plates 17 extending downward from a rear part of the respective main frame sections 13. In addition to the above, the frame F includes a first cross pipe 18 interconnecting front parts of the main frame sections 13, a second cross pipe 19 interconnecting upper parts of both pivot plates 17, and a third cross pipe 20 interconnecting lower parts of both pivot plates 17. The frame F also includes a pair of inclined right and left seat rails 21, extending from rear parts of the respective main frame sections 13.

Right and left steering handlebars 22 are operatively attached to the upper end of the front fork 11. In addition, a steering damper 23 is provided between an upper part of the head pipe 12 and the front fork 11.

A multi-cylinder engine E is supported by a lower part of both engine hangers 14 and also by upper parts of both pivot plates 17. The engine E may be a multi-cylinder engine in which four cylinders, for example, are arranged in parallel extending in a direction of the width of the body frame F.

The front end of a swing arm 24 is supported on the frame F via a spindle 25, so that the swing arm can be pivotally reciprocated, and the axle 26 of a rear wheel WR is supported by the rear end of the swing arm 24, so that the rear wheel can be rotatably turned.

Motive power from the output shaft 27 of a transmission, built in the body of the engine E, is transmitted to the rear wheel WR via chain transmission mechanism 28. The chain transmission mechanism 28 includes a driving sprocket 29 fixed to the output shaft 27, a driven sprocket 30 fixed to the rear wheel WR and an endless chain 31 wound on the sprockets 29, 30. In the motorcycle of FIG. 1, the chain transmission mechanism 28 is arranged on the left side of the engine E.

A link mechanism 32 is provided between the third cross pipe 20 and the swing arm 24, for coupling lower parts of both pivot plates 17, and the lower end of a rear shock absorber 33 is connected to a link 34 of the link mechanism 32. The upper end of the link mechanism is connected to the front of the swing arm 24.

An air cleaner 35 is arranged at the back of the head pipe 12 on the top of the engine E for filtering air supplied to the engine E. A fuel tank 36, covering the rear and the upper part of the air cleaner 35, is mounted on both main frame sections 13 out of the body frame F, and a radiator 37 is arranged in front of the engine E.

A main seat 38 is supported by the seat rails 21 at the back of the fuel tank 36, and a passenger seat 39 is supported by the seat rails 21 in a position behind and spaced apart from the main seat 38.

Filtered air from the air cleaner 35 is supplied to each cylinder of the engine E via funnels 39 which extend from the air cleaner 35, and via throttle bodies 40 connected to the lower ends of the funnels 39.

First injectors 41, corresponding to each cylinder of the engine E, are attached to the air cleaner for injecting fuel during high-speed revolution of the engine E. Second injectors 42 are attached to the throttle bodies 40, for injecting fuel in a state in which the engine E is operated at normal speeds. An intake duct 43 extends in a forward direction from the air cleaner, below the head pipe 21, for drawing outside air into the air cleaner 35.

Individual exhaust pipes 44 extended downward from the front of the engine E are individually connected to each cylinder in a lower part of the side wall on the front side of the engine E, and a pair of first collecting exhaust pipes 45 for connecting a pair of individual exhaust pipes 44 in common are arranged so that the first collecting exhaust pipes extend substantially longitudinally below the engine E.

In addition, a pair of the first collecting exhaust pipes 45 are connected to a single second collecting exhaust pipe 47 in an intermediate part of which a first exhaust muffler 46 is set in common, and the downstream end of the second collecting exhaust pipe 47 is connected to a second exhaust muffler 48. The second collecting exhaust pipe 47 rises, being curved toward the right side of the body from the downside of the engine E between the rear wheel WR and the engine E, and is further extended backward above the rear wheel WR.

An exhaust control valve 49 is arranged in the medial part of the second collecting exhaust pipe 47 for changing the area of a flow according to the speed of the engine E, and for controlling exhaust pulsation. The first exhaust muffler 46 is set in a part in which the second collecting exhaust pipe 47 rises and the downstream end of the second exhaust muffler 48 is arranged above the axle 26 of the rear wheel WR.

Each extended diameter part 45a is provided to the first collecting exhaust pipes 45 in a part arranged on the upstream side of the first exhaust muffler 46 and on the downside of the engine E, and a catalyst is housed in the extended diameter parts 45a. When the catalyst is arranged on the downside of the engine E as described above, exhaust gas exhausted from the engine E can enter the catalyst at relatively high temperature.

The front of the head pipe 12 is covered with a front cowl 51 made of synthetic resin, and both sides of the front of the body are covered with center cowls 52 made of synthetic resin. A pair of lower cowls 53, made of synthetic resin, cover the engine E from both sides, and are connected to the center cowls 52.

A front fender 55 is attached to the front fork 11, and covers the top of the front wheel WF. A rear fender 56 is attached to the seat rails 21, and covers the top of the rear wheel WR.

Figure 4:
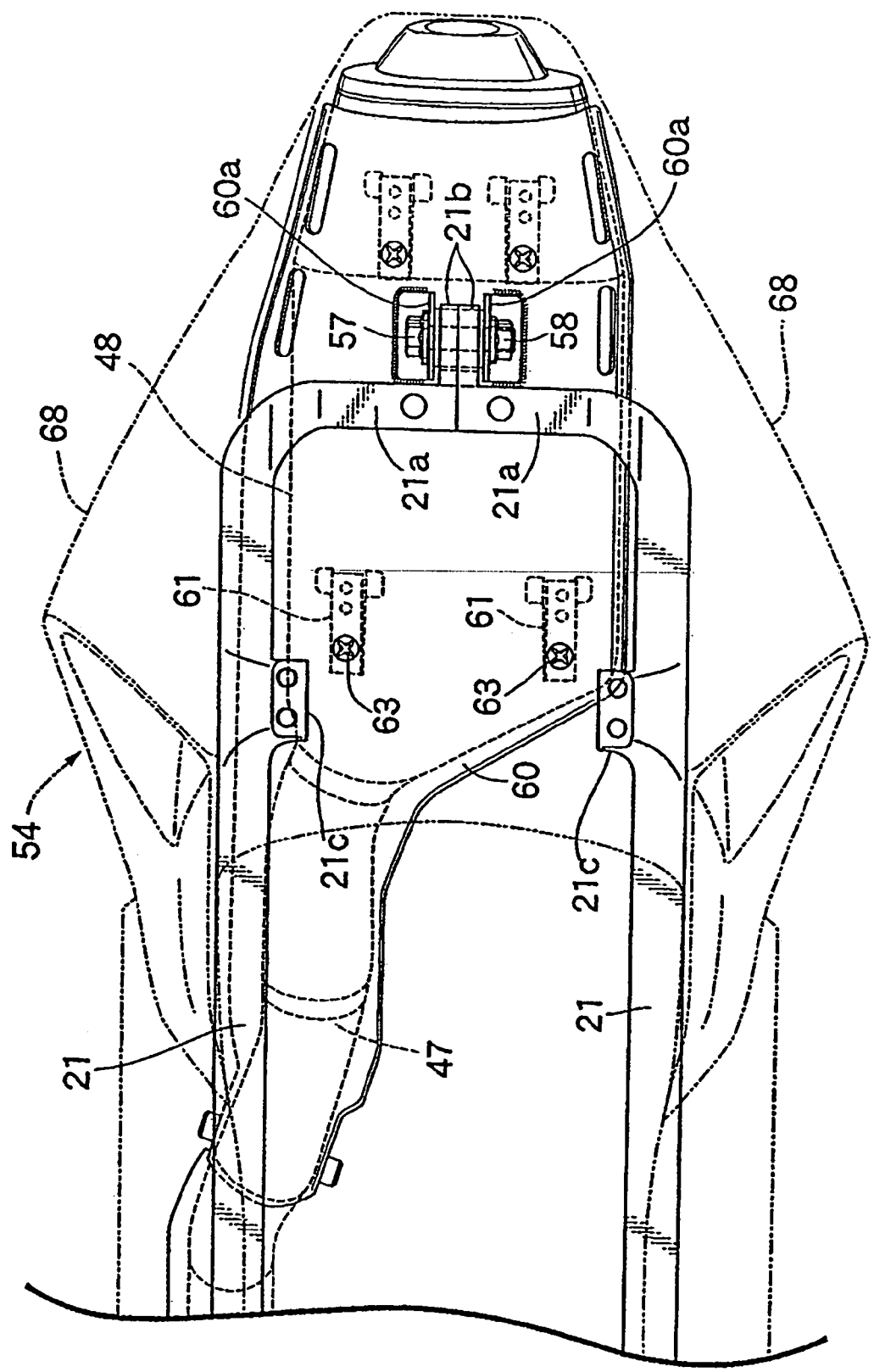
FIG. 4 is a plan view of an inner part of the rear portion of the motorcycle of FIGS. 1–3, viewed along a line 4—4 shown in FIG. 3, and in a state in which a rear cover apparatus is detached.
Figure 5:
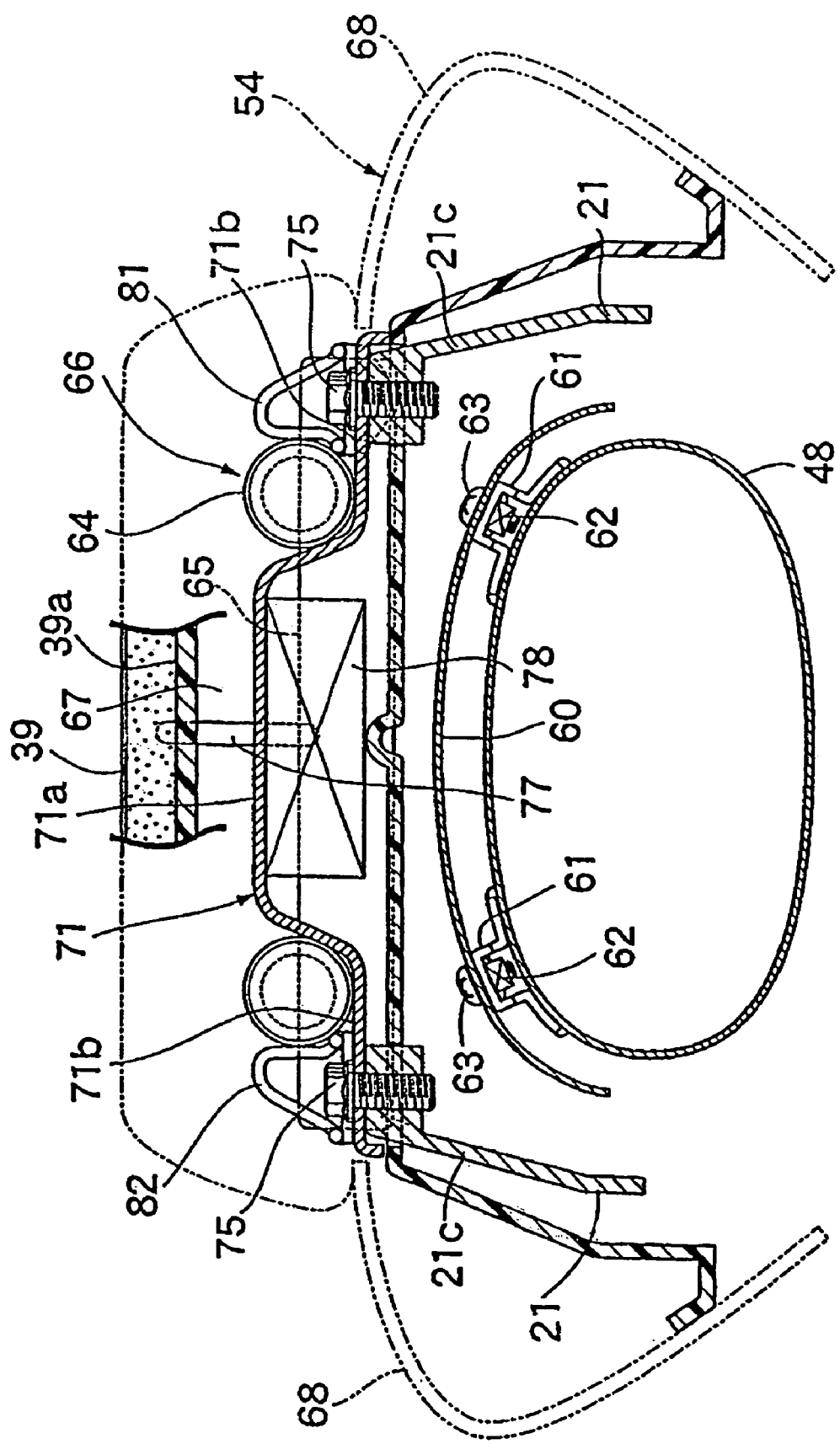
FIG. 5 is a sectional view of the rear portion of the motorcycle of FIGS. 1–3, viewed along a substantially vertical line 5—5 shown in FIG. 3.

As shown in FIG. 4, joints 21a, 21a, curved inside so that they are mutually matched, are integrated with the rear ends of a pair of the right and left seat rails 21, 21. Joining flanges 21b, 21b are provided at the ends of the joints 21a, 21a, that is, the matched ends, are connected by a bolt 57 and a nut 58 at the joining flanges 21b, 21b.

The second collecting exhaust pipe 47 and the second exhaust muffler 48 are arranged between both seat rails 21, 21, and the top of a part of the exhaust system extending from the intermediate part of the second collecting exhaust pipe 47 to the second exhaust muffler 48 are covered with a heat insulator 60.

Mounting plates 61, provided with welt nuts 62, are welded to the top of the second exhaust muffler 48 and the heat insulator 60 is fixed to the second exhaust muffler 48 by fitting and tightening screws 63 piercing the heat insulator 60 and each mounting plate 61 into the weld nuts 62. In addition, supporting plates 60a, 60a for holding the joining flanges 21b, 21b of both seat rails 21, 21 between both supporting plates are fastened to the heat insulator 60 and are fixed to both joining flanges 21b, 21b by jointly fastening the supporting plates by the bolt 57 and the nut 58. That is, as the heat insulator 60 is supported by both seat rails 21, 21, and is fixed to the second exhaust muffler 48, the second exhaust muffler 48 is also supported by both seat rails 21, 21.

Figure 6:
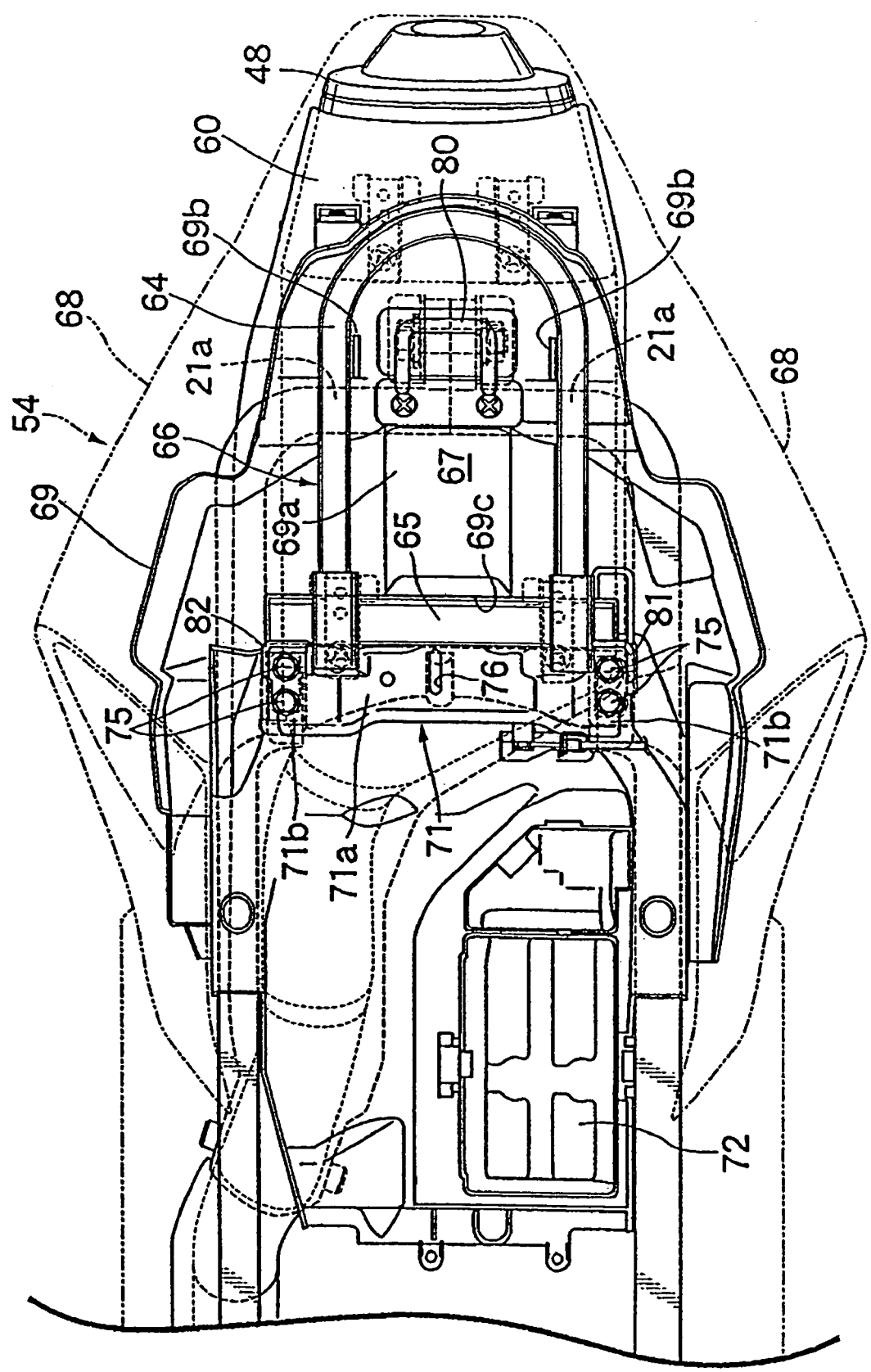
FIG. 6 is a top plan view of the rear portion of the motorcycle of FIGS. 1–4, corresponding to FIG. 4 in a state in which an upper cover and side covers out of the rear cover apparatus are detached.
Figure 7:
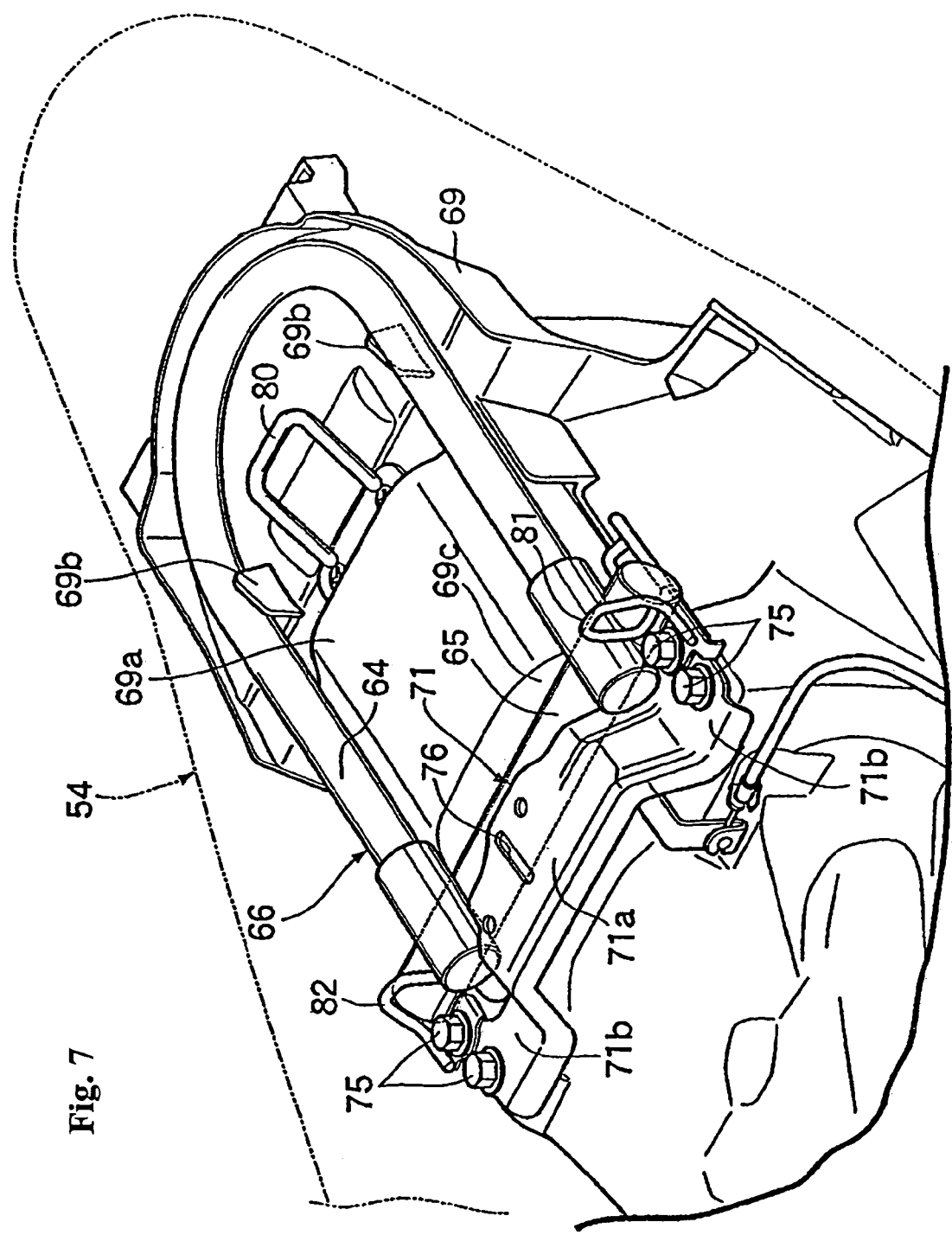
FIG. 7 is a perspective view of the rear portion of the motorcycle of FIG. 6, in the state in which an upper cover and side covers out of the rear cover apparatus are detached, and viewed from the diagonal top.

As also shown in FIGS. 6 and 7, the rear portions of the seat rails 21 are covered with a rear cover apparatus 54. The rear cover apparatus 54 covers at least the outside of each rear of both seat rails 21, 21, and a housing 67 is formed inside the rear cover 54 that can house a U-shaped locking anti-theft tool 66. The anti-theft tool 66 is provided with a substantially U-shaped main bar 64 and a bar 65 detachable in a direction perpendicular to both ends of the main bar 64.

The rear cover apparatus 54 is at least provided with a pair of right and left side covers 68, 68 covering a pair of the right and left seat rails 21 from the outside, and a bottom panel section 69 forming the bottom of the housing 67, provided between both side covers 68 and covering both seat rails 21 from the top, and in this embodiment, both side covers 68 are integrated with a Upper cover 70 forming the ceiling of the housing 67. In addition, the bottom panel section 69 is formed so that both sides cover most of each rear of the seat rails 21 from the outside, are extended below the seat rails 21 and are provided with a substantially U-shaped cross section open to the downside, prevents the seat rails 21 from being seen from the outside, owing to such a shape, and can enhance appearance quality.

To increase the volume of the housing 67, a swollen part swollen downward may also be provided to the bottom panel section 69 between both seat rails 21.

Projection bosses 21c, which pierce the bottom panel section 69 out of the rear cover apparatus 54 and the upper ends of which are protruded into the housing 67 are integrated with the right and left seat rails 21, and a metallic cross plate 71 is attached to and laid between the upper ends of both projection bosses 21c in the housing 67.

A platform 71a raised upward in the center between a pair of seat rails 21, and a pair of recessed flanking parts 71b, holding the platform 71a between them, are provided to the cross plate 71. Both recessed flanking parts 71b are respectively fastened to the upper ends of the projection bosses 21c of both seat rails 21, by suitable fasteners, such as a pair of bolts 75 for example.

The U-shaped locking anti-theft tool 66 is housed in the housing 67 on top of the cross plate 71, and a battery 72 and other components are housed and fixed in the housing 67 in front of the cross plate 71. A rear opening 73, for enabling the setting or extraction of the U-shaped locking anti-theft tool 66 into or from the housing 67, and a front opening 74, for enabling the setting/extraction of the battery 72 and others onto/from the housing 67 are provided to the upper cover 70 out of the rear cover apparatus 54. The rear opening 73 is covered with the passenger seat 39 that also functions as a lid, and the front opening 74 is covered with the main seat 38 that also functions as a lid.

A substantially U-shaped latch member 77 (FIG. 3) inserted into an insertion hole 76 provided to the platform 71a of the cross plate 71 so that the substantially U-shaped locking member can be detached is fastened to the front of the bottom plate 39a with which the passenger seat 39 is provided, and a locking clasp 78 for switching fitting to the latch member 77 is provided on the bottom of the platform 71a in a part corresponding to the insertion hole 76.

A fitting concave portion 79 open to the rear side in a substantially U shape is formed in the rear of the bottom plate 39a, and a fitting member 80 which can be fitted into the fitting concave portion 79 so that the fitting member can be detached is fastened to the joints 21a, 21a with the bottom panel section 69 held between the joints 21a of the seat rails 21.

Therefore, the extraction of the U-shaped locking anti-theft tool 66 from the housing 67 and the housing of the U-shaped locking anti-theft tool 66 into the housing 67 are enabled by opening the rear opening 73 by lifting the passenger seat 39, so that the fitting of the locking switching means 78 and the latch member 77 is released, and the fitting member 80 is detached from the fitting concave portion 79.

The main seat 38 is switched to a locked state and a locking released state by structure not shown, closes the front opening 74 so that the front opening can be opened, when the battery 72 and others are replaced, operation for lifting the main seat 38 is executed and the front opening 74 can be opened.

The main bar 64 of the U-shaped locking anti-theft tool 66 is fitted to the cross plate 71, and both ends of the main bar 64 are fitted onto the recessed flanking parts 71b on both sides of the cross plate 71.

In addition, position regulating members 81, 82 for positioning both ends of the bar 65 of the U-shaped locking anti-theft tool 66 are fixed onto the recessed flanking parts 71b. In addition, a raised part 69a raised upward for positioning the main bar 64 in a direction of the width of the body and located inside the main bar 64 of the U-shaped locking anti-theft tool 66 is provided to the bottom panel section 69 out of the rear cover apparatus 54, a pair of regulating plates 69b, 69b for positioning the main bar 64 in the direction of the width of the body so that they are touched to the insides of the rear of the main bar 64 are provided to the bottom panel section 69, and further, a concave portion 69c for housing a lower part of the bar 65 out of the U-shaped locking anti-theft tool 66 is provided to the bottom over 69 between the cross plate 71 and the raised part 69a.

Next, to explain the action of this embodiment, as the housing 67 is formed inside the rear cover apparatus 54 at least provided with a pair of the right and left side covers 68, 68 covering a pair of the right and left seat rails 21 from the outside and the bottom panel section 69 forming the bottom of the housing 67, provided between both side covers 68, 68 and covering a pair of the right and left seat rails 21 from the top and the U-shaped locking anti-theft tool 66 is formed in the housing 67, a degree of freedom in design below and between both seat rails 21 can be enhanced.

In addition, as the projection bosses 21c which pierce the bottom panel section 69 out of the rear cover apparatus 54 and the upper ends of which are protruded into the housing 67 are provided to the seat rails 21 and the main bar 64 of the U-shaped locking anti-theft tool 66 is fitted to the cross plate 71 laid between the upper ends of both projection bosses 21c in the housing 67, the supporting rigidity of the U-shaped locking anti-theft tool 66 can also be enhanced.

In addition, as the second exhaust muffler 48 for the engine E suspended from the main frame section 13 is arranged between both seat rails 21 below the bottom panel section 69 out of the rear cover apparatus 54 and is supported by both seat rails 21, the second exhaust muffler 48 can be arranged effectively using space made between both seat rails 21.

Further, as the platform 71a raised upward in the center between both seat rails 21 and a pair of the recessed flanking parts 71b holding the platform 71a between them and fastened to both projection bosses 21c are provided to the cross plate 71 and both ends of the main bar 64 of the U-shaped locking anti-theft tool 66 are fitted to both recessed flanking parts 71b, the rigidity of the cross plate 71 can be enhanced by curving the cross plate 71 and both ends of the main bar 64 can be stably supported by the cross plate 71 effectively using the curve of the cross plate 71.

An embodiment of the invention has been described above, however, the invention is not limited to the described embodiment, and various design changes are possible without deviating from the invention as set forth in the appended claims.

For example, in an embodiment, the case that the main seat 38 and the passenger seat 39 are used for a lid is described; however, a dedicated lid separate from the seat may also be provided on the rear cover apparatus 54.

As described above, according to the invention according to the first aspect hereof, a degree of freedom in design below and between both seat rails can be enhanced and in addition, the supporting rigidity of the U-shaped locking anti-theft tool can also be enhanced.

In an embodiment of the present invention according to the second aspect hereof, the exhaust muffler can be arranged effectively using space made between both seat rails.

Further, according to the invention according to the third aspect hereof, the rigidity of the cross plate can be enhanced and both ends of the main bar can be stably supported by the cross plate effectively using the curve of the cross plate.

Although the present invention has been described herein with respect to a number of specific illustrative embodiments, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

Having thus, described the invention, what is claimed is:

1. A housing support structure comprising a tool housing for receiving and supporting a U-shaped locking anti-theft tool in a vehicle having a main frame section and a pair of right and left seat rails connected to a rear portion of the main frame section;

wherein said U-shaped locking anti-theft tool is provided with a substantially U-shaped main bar and a connector bar which is removably attachable to the main bar and which extends in a direction substantially perpendicular to both ends of the main bar, said housing support structure comprising a rear cover apparatus, wherein:

the rear cover apparatus comprises a pair of right and left side covers covering both seat rails from the outside, and a bottom panel section forming the bottom of the housing and having two spaced-apart holes formed therein, said bottom panel section extending between both side covers and covering both seat rails from the top;

each seat rail comprises a projection boss which extends through a respective one of the holes formed in the bottom panel section, and the upper end of which projects into the housing;

a cross plate is provided in the housing extending between the upper ends of both projection bosses, and the main bar of the U-shaped locking anti-theft tool rests on said cross plate.

2. The housing support structure for a U-shaped locking anti-theft tool in a vehicle according to claim 1, wherein an exhaust muffler, for an engine suspended from the main frame section, is disposed between the seat rails below the bottom panel section, and wherein the exhaust muffler is operatively supported by both seat rails.

3. The housing support structure for a U-shaped locking anti-theft tool in a vehicle according to claim 1, wherein the cross plate comprises a raised platform between the seat rails, and a pair of recessed flanking parts holding the platform between them and fastened to the respective projection bosses;

and wherein the recessed flanking parts are configured and dimensioned to supportively receive the respective ends of the main bar of the U-shaped locking anti-theft tool.

4. A motorcycle comprising the housing support structure of claim 1.

5. A housing support structure comprising a tool housing adapted for receiving and supporting a U-shaped locking anti-theft tool in a vehicle having a main frame section and a pair of right and left seat rails connected to a rear portion of the main frame section, wherein said U-shaped locking anti-theft tool is provided with a substantially U-shaped main bar and a connector bar which is removably attachable to the main bar and which extends in a direction substantially perpendicular to both ends of the main bar, said housing support structure comprising a rear cover apparatus, wherein:

the rear cover apparatus comprises a pair of right and left side covers for covering both seat rails from the outside, and a bottom panel section forming the bottom of the housing, said bottom panel section extending between both side covers and provided for covering both seat rails from the top;

wherein said housing is configured to fit on top of said seat rails with a major part of said seat rails disposed outside of the housing.

6. The housing support structure of claim 5, wherein a cross plate is provided in the housing extending between the upper ends of both projection bosses, and the main bar of the U-shaped locking anti-theft tool rests on said cross plate.

7. The housing support structure according to claim 5, wherein an exhaust muffler is disposed between the seat rails below the bottom panel section, and wherein the exhaust muffler is operatively supported by both seat rails.

8. The housing support structure of claim 7, further comprising a heat-insulating material operatively attached to the rear cover apparatus below the bottom panel section.

9. The housing support structure for a U-shaped locking anti-theft tool in a vehicle according to claim 5,
wherein the cross plate comprises a raised platform between the seat rails, and a pair of recessed flanking parts holding the platform between them and fastened to the respective projection bosses; and
wherein the recessed flanking parts are configured and dimensioned to supportively receive the respective ends of the main bar of the U-shaped locking anti-theft tool.

10. A motorcycle comprising the housing support structure of claim 5.

11. The motorcycle of claim 10, further comprising a driver's seat and a passenger's seat, each of said seats being pivotally connected to the rear cover apparatus.

* * * * *